United States Patent [19]

Greinke et al.

[11] Patent Number: 5,372,619
[45] Date of Patent: Dec. 13, 1994

[54] METHOD FOR STORING METHANE USING A HALOGENATING AGENT TREATED ACTIVATED CARBON

[75] Inventors: Ronald A. Greinke, Medina; Richard I. Bretz, Parma, both of Ohio; Joseph T. Mullhaupt, Williamsville, N.Y.

[73] Assignee: Ucar Carbon Technology Corporation, Danbury, Conn.

[21] Appl. No.: 960,811

[22] Filed: Oct. 14, 1992

[51] Int. Cl.$^5$ .............. F17C 11/00; B01J 20/20; C01B 31/10; C01B 31/12

[52] U.S. Cl. .................. 48/127.3; 123/1 A; 206/0.7; 502/181; 502/416; 502/417; 502/526

[58] Field of Search .............. 502/417, 416, 526, 181, 502/216, 217, 224, 426; 206/0.7; 48/127.3

[56] References Cited

U.S. PATENT DOCUMENTS

| | | | |
|---|---|---|---|
| 1,694,040 | 12/1928 | Ray et al. | 502/423 |
| 1,819,165 | 8/1931 | Hass | 502/425 |
| 2,161,710 | 6/1939 | Jaeger | 502/416 |
| 3,305,315 | 2/1967 | Bacon et al. | 23/209.1 |
| 3,662,523 | 5/1972 | Revoir et al. | 55/387 |
| 4,082,694 | 4/1978 | Wennerberg et al. | 252/444 |
| 4,508,851 | 4/1985 | Izumi et al. | 502/426 |
| 4,716,736 | 1/1988 | Shwarz | 62/48 |
| 4,831,011 | 5/1989 | Oikawa et al. | 502/417 |
| 4,943,552 | 7/1990 | Osajima et al. | 502/426 |
| 5,102,855 | 4/1992 | Greinke et al. | 502/436 |
| 5,179,058 | 1/1993 | Knoblauch et al. | 502/432 |

FOREIGN PATENT DOCUMENTS

| 24022 | 6/1936 | Austria | 502/181 |
|---|---|---|---|

OTHER PUBLICATIONS

Report of the Ontario Ministry of Transportation and Communications AF-87-02-Mar. 1987 "The Development and Performance Testing of Adsorbent Carbon for the Storage of Compressed Natural Gas"-S. S. Barton, J. R. Dacey, M. J. B. Evans, J. A. Holland, D. F. Quinn.

Primary Examiner—Paul E. Konopka
Attorney, Agent, or Firm—F. J. McCarthy

[57] ABSTRACT

A halogenated or sulfonated active carbon which has a high storage capacity for methane is provided from selected halogens in elemental form or solutions of such halogens or from solutions of sulfuric acid, fuming sulfuric acid, sulfur trioxide.

4 Claims, No Drawings

METHOD FOR STORING METHANE USING A HALOGENATING AGENT TREATED ACTIVATED CARBON

FIELD OF THE INVENTION

The invention relates to the improved storage of methane or natural gas on a high surface area activated carbon produced from commercially available, or similarly activated carbons, by halogenation with chlorine, bromine, iodine or by sulfonation using sulfuric acid, fuming sulfuric acid or sulfur trioxide.

BACKGROUND OF THE INVENTION

Activated carbon can be used for adsorption purposes, such as the extraction of gases or vapors from products, for adsorption of liquids and for solvent recovery in various applications. One process used in producing highly active gas adsorbent carbon consists of charring carbonaceous material, such as coconut shells, by application of heat and the further treatment of the carbon so produced with an oxidizing agent such as steam which slowly oxidizes the carbon.

U.S. Pat. No. 1,694,040 discloses a process for making dense strong activated charcoal by impregnating nut cellulose with a dehydrating agent, such as phosphoric acid or zinc chloride, heating the mixture to a temperature not materially below 350° C., leaching out the soluble components and then reheating the resulting carbon in an oxidizing atmosphere.

U.S. Pat. No. 1,819,165 discloses a process for producing highly active gas adsorbent carbon by impregnating carbonaceous material with phosphoric acid, then calcining said impregnated material in the absence of oxygen and then submitting the calcined product to controlled partial oxidation at temperature above 700° C.

U.S. Pat. No. 3,305,314 discloses a process for producing permanently dehydrated heat treated material from a cellulosic textile material which comprises subjecting the cellulosic material to a controlled partial and selective decomposition of the cellulosic molecule by immersing the cellulosic material in an acid solution to wet the material therewith, removing the wet material from the solution, drying the material to remove the solvent therefrom and heat treating the dried material in an oxidizing atmosphere whereby decomposition involves a rupture of the carbon-oxygen and carbon-hydrogen bonds and the evolution of water, but falling just short of the scission of the main cellulose molecule, through the rupture of the carbon-carbon bonds with the evolution of hydrogen.

U.S. Pat. No. 5,102,855 discloses a process for producing activated carbon, preferably high surface area activated carbon, from inexpensive cellulosic precursor with the activating agent, such as phosphoric acid, followed by carbonization in the inert atmosphere at an elevated temperature to produce activated carbon. The activated carbon can be further activated to increase its surface area by heating it in an oxidizing atmosphere at an elevated temperature to yield activated carbon having a surface area of at least 1000 m$^2$/g.

A report of the Ontario Ministry of Transportation and Communications AF-87-02-March 1987 "The Development and Performance Testing of Adsorbent Carbon for the Storage of Compressed Natural Gas"—S. S. Barton, J. R. Dacey, M. J. B. Evans, J. A. Holland, D. F. Quinn, describes work in which fluorine treatment of activated carbons was carried out to determine whether the adsorption of methane could be increased. Fluorination was carried out on Saran carbon and on AX-21 Amoco-type carbon to varying degrees. The fluorinated carbons produced were characterized as to surface area and micropore volume and investigated for methane uptake at 25° C. It was reported that every sample produced showed a substantial reduction in surface area and micropore volume and adsorbed considerably less methane than the original carbon. It was further reported that fluorination of carbons was not considered to be a worthwhile venture.

Active carbon has been used extensively in gas and vapor adsorption devices and is also well suited for the storage of gases such as methane.

It is an object of the present invention to provide a relatively low cost process for treating high surface area activated carbons by halogenation with chlorine, bromine, iodine or by sulfonation with sulfuric acid, fuming sulfuric acid, sulfur trioxide to produce a material having increased storage capacity for gases such as methane.

It is another object of the present invention to provide activated carbons, preferably high surface area activated carbons, that can be utilized in storage containers to more efficiently store gases such as methane, hydrogen and natural gas.

It is another object of the present invention to provide a process for treating high surface area activated carbon to increase its gas storage capacity that is cost effective to produce and easy to practice.

SUMMARY OF THE INVENTION

The invention relates to a process for providing an activated carbon product having increased methane storage capability by treating an activated carbon with a material selected from (i) elemental chlorine, bromine and iodine, (ii) solutions of chlorides incorporating an oxidizing agent such as $HNO_3$, chlorates, chlorites, bromides incorporating an oxidizing agent such as $HNO_3$, bromates, bromites, iodides incorporating an oxidizing agent such as $HNO_3$, iodates (iii) sulfuric acid, fuming sulfuric acid, sulfur trioxide to provide an activated carbon containing from 0.01% to about 4% by weight of a material selected from chlorine, bromine, iodine, sulfur, said material having an increased methane loading capability as compared to untreated activated carbon. Many chemical reagents could be used to introduce the halogens, Cl, Br and I to the surface of an active carbon in accordance with the present invention. These reagents are not limited to those presented in the following specific examples but may include mixtures of such halogens such as ICl the oxides of the above halogens, such as $Cl_2O$, $ClO_2$, $Cl_2O_6$, $Cl_2O_7$, $Br_2O$, $Br_3O_8$, $BrO_3$, $BrO_2$, $Br_2O_7$, $I_2O_4$, $I_4O_9$, $I_2O_5$, the oxyacids of the halogens, such as $HClO$, $HClO_2$, $HClO_3$, $HClO_4$, $HBrO$, $HBrO_2$, $HBrO_3$, $HIO$, $HIO_3$, $HIO_4$, $H_5IO_6$, $H_4I_2O_9$, the various metal salts of the oxyacids, such as hypochlorites, chlorates, perchlorates, chlorites, periodates, bromates, iodates etc. Also, thionyl chloride and sulfuryl chloride can be utilized to add chlorine to active carbons in the practice of the present invention.

Active carbons, such as those used as starting materials in the practice of present invention are known to have structures of thin folded sheets of graphitic carbon which are convoluted in such a way as to form micropores and macropores in the carbon.

It is believed that by the practice of the present invention the surface of the internal micropores and/or macropores of activated carbons is provided with increased polarity which results in a stronger attraction of methane on the surface of the micropores and/or macropores within the activated carbons, thus increasing the storage density of methane.

The halogenation of an active carbon, becomes more effective for natural gas storage as the atomic size of the halogen increases. Fluorination is not effective at any concentration in the carbon, while the chlorination and bromination are effective at relatively low concentrations, 0.01% to 0.70% and 0.01% to 1.5% respectively and iodination appears effective even at relatively high concentrations in the carbon of 0.01% to 4.0%. This is unexpected since one would expect the bulkier halogens to plug up or block the pores on the active carbon.

The concentration of sulfur in the carbons suitably ranges from 0.01% to 3.0%.

When a non-oxygen bearing compound of chlorine, bromine, iodine such as chlorides, bromides and iodides is employed as a halogenating agent in the practice of the present invention, an oxidizing agent such as $HNO_3$ $KMnO_4$, $Ce(SO_4)_2$ is used with the halogenating agent in amounts for example, sufficient to oxidize a major portion of the non-oxygen bearing halogen which will then combine with the active carbon to the aforementioned concentration ranges to achieve the desired loading.

Example A

To evaluate the effectiveness of activated carbon for gas storage applications, the effective storage was calculated using the definition of effective storage as the storage of gas at high pressure of 500 psia minus the storage of gas at a low pressure of 14.7 psia. This value would represent the amount of deliverable gas to an engine or other receiving means. The effective storage is calculated using the loading ratio correlation equation assuming that the active carbon can be compacted to a density of 0.85 g/cc or about 53 lb/ft$^3$.

The loading ratio correlation (LRC) equation was used to evaluate methane loading of the active carbons. The LRC adsorption isotherm equation is:

$$\frac{L}{Lo} = \frac{(K \times P)^{1/n}}{[(1 + (K \times P)]^{1/n}}$$

where
- L is the loading (milli-moles/g) at a given pressure, P, of methane,
- Lo is the maximum capacity of the active carbon absorbent,
- K is the interaction coefficient and is a constant for a given temperature and carbon,
- n is a coefficient that measures the deviation from Langmuir behavior (LRC is based on the Langmuir adsorption isotherm in which n=1). The coefficient is a constant for a given carbon at a given temperature.

The LRC equation is for a single adsorbate, such as methane, at a constant temperature of 25° C. The loading of methane at 500 psia on the carbon was measured gravimetrically using the conventional McBain sorption balance technique. Measurement of the BET surface area was accomplished using Micrometrics Digisorb 2600.

EXAMPLE 1—CONTROL

Commercially available activated carbon, Anderson AX-21 was tested as received from the manufacturer with the following results:
Surface Area=2807 m$^2$/g
Loading at 500 psi=9,417 mmol/g
Effective Storage=7,354 lb/ft$^3$

EXAMPLE 2

Activated carbon (AX-21) in the amount of 5 grams was placed in a beaker and 15 ml of Clorox (Trademark of Clorox Company) an aqueous solution of sodium hypochlorite (5.25% strength; 0,375 gms chlorine), and 85 ml of water were added to the beaker and the mixture was stirred and the materials reacted in the beaker for one hour. A solid reaction product was recovered by filtration and was washed with about 750 ml of water and then dried in air in an oven for two hours at 120° C. The dried chlorinated material was heated in argon for one hour at 400° C. The resulting material was subjected to testing and measurements with the following results:
Surface Area=2923 m$^2$/g
Loading at 500 psi=9.918 mmol/g
Effective Storage=7,689 lb/ft$^3$
Chlorine=0.39% by weight
The increases in loading and effective storage, respectively are 5.3% and 4.6%.

EXAMPLE 3

Activated carbon (AX-21) in the amount of 5 grams was placed in a beaker and 1.25 ml of $HNO_3$ (70% strength), 3.75 ml of HCl (37.5% strength; 1.625 gms chlorine) and 95 ml of water were added to the beaker and the mixture was stirred and the materials reacted in the beaker for one hour. A solid reaction product was recovered by filtration and was washed with water and then dried in air in an oven for two hours at 120° C. The dried chlorinated material was heated in argon for one hour at 400° C. The resulting material was subjected to testing and measurements with the following results:
Surface Area=3026 m$^2$/g
Loading at 500 psi=10.221 mmol/g
Effective Storage=7.901 lb/ft$^3$
Chlorine=0.08% by weight
The increases in loading and effective storage, respectively are 9.2% and 7.4%.

EXAMPLE 4

Activated carbon (AX-21) in the amount of 5 grams was placed in a beaker and 5 ml of $HNO_3$ (70% strength), 15 ml of HCl (37.5% strength; 6.5 gms chlorine) and 80 ml of water were added to the beaker and the mixture was stirred and the materials reacted in the beaker for one hour. A solid reaction product was recovered by filtration and was washed with water and then dried in air in an oven for two hours at 120° C. The dried chlorinated material was heated in argon for one hour at 400° C. The resulting material was subjected to testing and measurements with the following results:
Surface Area=2685 m$^2$/g
Loading at 500 psi=10.347 mmol/g
Effective Storage=7.994 lb/ft$^3$
Chlorine=0.08% by weight
The increases in loading and effective storage, respectively are 9.9% and 8.7%.

EXAMPLE 5

Activated carbon (AX-21) in the amount of 5 grams was placed in a beaker and 25 ml of Clorox (Trademark of Clorox Company) an aqueous solution of sodium hypochlorite (5.25% strength; 0.625 g chlorine) and 75 ml of water were added to the beaker and the mixture was stirred and the materials reacted in the beaker for one hour. A solid reaction product was recovered by filtration end was washed with water and then dried in air in an oven for two hours at 120° C. The dried chlorinated material was heated in argon for one hour at 500° C. The resulting material was subjected to testing and measurements with the following results:

Surface Area = 2736 $m^2/g$
Loading at 500 psi = 9.979 mmol/g
Effective Storage = 7.755 $lb/ft^3$
Chlorine = 0.39% by weight The increases in loading and effective storage, respectively are 5% and 5.5%.

EXAMPLE 6 (Comparative Example)

Activated carbon (AX-21) in the amount of 5 grams was placed in a beaker and 100 ml of Clorox (Trademark of Clorox Company) and an aqueous solution of sodium hypochlorite (5.25% strength; 2.5 gms chlorine) were added to the beaker and the mixture was stirred and the materials reacted in the beaker for one hour. A solid reaction product was recovered by filtration and was washed with water and then dried in air in an oven for 2 hours at 120° C. The dried chlorinated material was heated in argon for one hour at 500° C. The resulting material was subjected to testing and measurements with the following results:

Surface Area = 1759 $m^2/g$
Loading at 500 psi = 6.943 mmol/g
Effective Storage = 5.474 $lb/ft^3$
Chlorine = 2.28% by weight The decreases in loading and effective storage, respectively are 26.2% and 25.5%.

This example shows that at increased levels of chlorine in the active carbon, methane storage properties of the active carbon are diminished.

EXAMPLE 7

Activated carbon (AX-21) in the amount of 5 grams was placed in a beaker and 5 ml of $HNO_3$ (70% strength), 10 ml of HBr (50% strength; 7.35 gms Br) and 85 ml of water were added to the beaker and the mixture was stirred and the materials reacted in the beaker for one hour. A solid reaction product was recovered by filtration and was washed with water and then dried in air in an oven for two hours at 120° C. The dried brominated material was heated in argon for one hour at 400° C. The resulting material was subjected to testing and measurements with the following results:

Surface Area = 3050 $m^2/g$
Loading at 500 psi = 11.22 mmol/g
Effective Storage = 8.71 $lb/ft^3$
Bromine = 0.01% by weight The increases in loading and effective storage, respectively are 19.2% and 18.4%.

EXAMPLE 8

Activated carbon (AX-21) in the amount of 5 grams was placed in a beaker and 5 ml of $HNO_3$ (70% strength), 10 ml of HBr (50% strength; 7.35 gms Br) and 85 ml of water were added to the beaker and the mixture was stirred and the materials reacted in the beaker for one hour. A solid reaction product was recovered by filtration and was washed with water and then dried in air in an oven for two hours at 120° C. The dried brominated material was heated in argon for one hour at 400° C. The resulting material was subjected to testing and measurements with the following results:

Surface Area = 2976 $m^2/g$
Loading at 500 psi = 11.37 mmol/g
Effective Storage = 8.91 $lb/ft^3$
Bromine = 292 ppm by weight The increases in loading and effective storage, respectively are 20.7% and 21.2%.

EXAMPLE 9

Activated carbon (AX-21) in the amount of 5 grams was placed in a beaker with 90 ml of water and the mixture was stirred on a hot plate to the boiling point of water and 5 ml of $HNO_3$ (70% strength), 10 ml of HBr (50% strength; 7.35 gms Br) were added to the beaker and the mixture was stirred and the materials reacted in the beaker for one hour. A solid reaction product was recovered by filtration and was washed with water and then dried in air in an oven for two hours at 120° C. The dried brominated material was heated in argon for one hour at 400° C. The resulting material was subjected to testing and measurements with the following results:

Surface Area = 3000 $m^2/g$
Loading at 500 psi = 10.42 mmol/g
Effective Storage = 8.06 $lb/ft^3$
Bromine = 75 ppm by weight The increases in loading and effective storage, respectively are 10.7% and 9.6%.

EXAMPLE 10

Activated carbon (AX-21) in the amount of 5 grams was placed in a jar and 0.84 gm $Br_2$ in a small open vial was dropped on top of the activated carbon and the jar was immediately sealed and the mixture was shaken and reacted in the jar for several minutes and the jar was allowed to stand overnight (18 hrs). A solid reaction product was washed with water and then dried in air in an oven for two hours at 120° C. The dried brominated material was heated in argon for one hour at 400° C. The resulting material was subjected to testing and measurements with the following results:

Surface Area = 2939 $m^2/g$
Loading at 500 psi = 10.52 mmol/g
Effective Storage = 8.20 $lb/ft^3$
Bromine = 0.62% by weight The increases in loading and effective storage, respectively are 11.7% and 11.5%.

EXAMPLE 11

A procedure identical to Example 10 was used except that the amount of $Br_2$ used was only 0.034 gm instead of 0.84 gm. The resulting material was subjected to testing and measurements with the following results:

Surface Area = 3168 $m^2/g$
Loading at 500 psi = 10.32 mmol/g
Effective Storage = 8.015 $lb/ft^3$
Bromine = 0.42% by weight The increases in loading and effective storage, respectively are 9.6% and 9.0%.

EXAMPLE 12 (Comparative Example)

Activated carbon (AX-21) in the amount of 5 grams was placed in a beaker and 25 ml of $HNO_3$ (70% strength), 50 ml of water and 25 ml of HBr (50% strength; 18.25 gms Br) were added to the beaker and the mixture was stirred and the materials reacted in the beaker for one hour. A solid reaction product was recovered by filtration and was washed with water and then dried in air in an oven for two hours at 120° C. The dried brominated material was heated in argon for one hour at 300° C. The resulting material was subjected to testing and measurements with the following results:
  Surface Area = 2665 $m^2/g$
  Loading at 500 psi = 8.89 mmol/g
  Effective Storage = 6.95 $lb/ft^3$
  Bromine = 1.74% by weight
The decreases in loading and effective storage, respectively are 5.6% and 5.5%.

This example shows that an excess of bromine can interfere with and diminish methane storage.

EXAMPLE 13

Activated carbon (AX-21) in the amount of 5 grams was placed in a beaker and 0.20 gm of ICl (solid; 0.16 g iodine and 0.04 g chlorine) and 100 ml of methanol (solvent) were added to the beaker and the slurry was stirred and the materials reacted in the beaker for one hour. A solid reaction product was recovered by filtration and was washed with water and then dried in air in an oven for two hours at 120° C. The dried iodinated material was heated in argon for one hour at 300° C. The resulting material was subjected to testing and measurements with the following results:
  Surface Area = 3095 $m^2/g$
  Loading at 500 psi = 10.57 mmol/g
  Effective Storage = 8.196 $lb/ft^3$
  Iodine = 1.91% by weight
  Chlorine = 34 ppm by weight
The increases in loading and effective storage, respectively are 12.2% and 11.4%.

EXAMPLE 14

Activated carbon (AX-21) in the amount of 5 grams was placed in a beaker and 0.20 gm of ICl (solid; 0.16 g iodine and 0.04 g chlorine) and 100 ml of methanol (solvent) were added to the beaker and the slurry was stirred and the materials reacted in the beaker for one hour. A solid reaction product was recovered by filtration and was washed with water and then dried in air in an oven for two hours at 120° C. The dried iodinated material was heated in argon for one hour at 400° C. The resulting material was subjected to testing and measurements with the following results:
  Surface Area = 3100 $m^2/g$
  Loading at 500 psi = 10.45 mmol/g
  Effective Storage = 8.092 $lb/ft^3$
  Iodine = 4.01% by weight
  Chlorine = 0.18% by weight
The increases in loading and effective storage, respectively are 10.5% and 10.0%.

EXAMPLE 15

Water in the amount of 100 ml, 1.0 gm of iodine (solid) and 15 ml of $HNO_3$ (70% concentration) were placed in a beaker and stirred for about 15 minutes until the $HNO_3$ aqueous solution was saturated with dissolved iodine. Activated carbon (AX-21) in the amount of 5 grams was placed in a separate beaker and 100 ml of the saturated iodine solution were added to the beaker and the mixture was stirred and the materials reacted in the beaker for one hour. A solid reaction product was recovered by filtration and was washed with water and then dried in air in an oven for two hours at 120° C. The dried iodinated material was heated in argon for one hour at 400° C. The resulting material was subjected to testing and measurements with the following results:
  Surface Area = 3138 $m^2/g$
  Loading at 500 psi = 10.26 mmol/g
  Effective Storage = 7,947 $lb/ft^3$
  Iodine = 0.01% by weight
The increases in loading and effective storage, respectively are 9.0% and 8.1%.

EXAMPLE 16—CONTROL

Activated carbon fibers (A-20- produced by Osaka Gas Company from a pitch precursor) was tested as received with the following results:
  Surface Area = 2201 $m^2/g$
  Loading at 500 psi = 7.16 mmol/g
  Effective Storage = 5.7 $lb/ft^3$

EXAMPLE 17

Activated carbon (A-20) in the amount of 5 grams was placed in a beaker and 100 ml of sulphuric acid ($H_2SO_4$; 98% strength) were added and the mixture was stirred and the materials reacted in the beaker for one hour. A solid reaction product was recovered by filtration and was washed with water and then dried in air in an oven for 16 hours at 120° C. The dried sulfonated material was heated in argon for one hour at 400° C. The resulting material was subjected to testing and measurements with the following results:
  Surface Area = 2308 $m^2/g$
  Loading at 500 psi = 7.43 mmol/g
  Effective Storage = 5.90 $lb/ft^3$
The increases in loading and effective storage, respectively are 3.8% and 3.5%.

EXAMPLE 18—CONTROL

Activated carbon (Black Pearls 2000 produced by Cabot Corp. from an aromatic hydrocarbon precursor) was tested as received with the following results:
  Surface Area = 1499 $m^2/g$
  Loading at 500 psi = 5.82 mmol/g

EXAMPLE 19

Activated carbon (Black Pearls 2000) in the amount of 5 grams was placed in a beaker and 100 ml of sulphuric acid ($H_2SO_4$; 96% strength) were added to the beaker and the mixture was stirred and the materials reacted in the beaker for one hour. A solid reaction product was recovered by filtration and was washed with water and then dried in air in an oven for 16 hours at 120° C. The dried sulfonated material was heated in argon for one hour at 400° C. The resulting material was subjected to testing and measurements with the following results:
  Loading at 500 psi = 6,83 mmol/g
  Sulfur = 0.39% by weight
The increase in loading is 17.3%.

EXAMPLE 20—CONTROL

Activated carbon (Aqua Pac produced by Westvaco Chemicals from bituminous coal) was tested as received with the following results:
  Surface Area = 502 $m^2/g$
  Loading at 500 psi = 2.96 mmol/g

EXAMPLE 21

Activated carbon (Aqua Pac) in the amount of 5 grams was placed in a beaker and 100 ml of sulfuric acid ($H_2SO_4$; 96% strength) were added to the beaker and the mixture was stirred and the materials reacted in the beaker for one hour. A solid reaction product was recovered by filtration and was washed with water and then dried in air in an oven for 16 hours at 120° C. The dried sulfonated material was heated in argon for one hour at 400° C. The resulting material was subjected to testing and measurements with the following results:

Surface Area = 611 $m^2/g$
Loading at 500 psi = 3.20 mmol/g

The increase in loading is 8.1%.

EXAMPLE 22—CONTROL

Activated carbon (Nuchar SN produced by Westvaco from wood) was tested as received with the following results:

Surface Area = 1308 $m^2/g$
Loading at 500 psi = 4.49 mmol/g
Effective Storage = 3.83 $lb/ft^3$

EXAMPLE 23

Activated carbon (Nuchar SN) in the amount of 5 grams was placed in a beaker and 100 ml of sulfuric acid ($H_2SO_4$; 96% strength) were added to the beaker and the mixture was stirred and the materials reacted in the beaker for one hour. A solid reaction product was recovered by filtration and was washed with water and then dried in air in an oven for 16 hours at 120° C. The dried sulfonated material was heated in argon for one hour at 400° C. The resulting material was subjected to testing and measurements with the following results:

Surface Area = 1512 $m^2/g$
Loading at 500 psi = 4.85 mmol/g
Effective Storage = 4.16 $lb/ft^3$ The increases in loading and effective storage, respectively are 8.0% and 8.6%.

What is claimed is:

1. A method for methane storage which comprises treating an activated carbon having micropores and macropores capable of storing methane with a halogenating agent selected from the group consisting of elemental chlorine, bromine and iodine and solutions containing chlorates, chlorites, bromates, boromites and iodates to provide a solid reaction product, washing said product with water, drying said washed product and heating said dried product at a temperature of about 400° C. for about one hour to form a treated activated carbon with a loading of from 0.01% to about 4% of a material selected from the group consisting of chlorine, bromine and iodine and having an increased methane loading capability and an increased surface area, as compared to said untreated activated carbon; and loading said treated activated carbon with methane.

2. Method in accordance with claim 1 wherein said halogenating agent is chlorine and the treated activated carbon contains 0.01% to 0.7% by weight of chlorine.

3. Method in accordance with claim 1 wherein said halogenating agent is bromine and the treated activated carbon contains 0.01% to 1.5% by weight of bromine.

4. Method in accordance with claim 1 wherein said halogenating agent is iodine and the treated activated carbon contains 0.01% to 4% by weight of iodine.

* * * * *